(12) United States Patent
Neese (10) Patent No.: US 10,864,968 B2
(45) Date of Patent: *Dec. 15, 2020

(54) JUMP SEAT ASSEMBLY

(71) Applicant: Grady-WHite Boats, Inc., Greenville, NC (US)

(72) Inventor: David A. Neese, Greenville, NC (US)

(73) Assignee: Grady-White Boats, Inc., Greenville, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/516,332

(22) Filed: Jul. 19, 2019

(65) Prior Publication Data

US 2019/0337596 A1     Nov. 7, 2019

Related U.S. Application Data

(63) Continuation of application No. 15/903,105, filed on Feb. 23, 2018, now Pat. No. 10,399,644.

(51) Int. Cl.
| B63B 29/04 | (2006.01) |
| B60N 2/36 | (2006.01) |
| B60N 2/30 | (2006.01) |

(52) U.S. Cl.
CPC ............ B63B 29/04 (2013.01); B60N 2/3034 (2013.01); B60N 2/36 (2013.01); *B63B 2029/043* (2013.01)

(58) Field of Classification Search
CPC ........ B60N 2/3034; B60N 2/36; B63B 29/04; B63B 2/3034; B63B 2/36
See application file for complete search history.

(56) References Cited

U.S. PATENT DOCUMENTS

| 155,706 A | 10/1874 | Cahill |
| 214,051 A | 4/1879 | Morgan |
| 522,608 A | 7/1894 | Macklin |
| 595,624 A | 12/1897 | Hale |
| 685,914 A | 11/1901 | Stark |
| 686,914 A | 11/1901 | Stark |
| 709,286 A | 9/1902 | Wilkinson |
| 793,605 A | 6/1905 | Norcross |
| 912,781 A | 2/1909 | Barrett et al. |
| 2,610,329 A | 9/1952 | Strathaus |
| 3,419,305 A | 12/1968 | Baran |
| 3,667,803 A | 6/1972 | Ford |
| 3,951,449 A | 4/1976 | Crowther |
| 4,993,666 A * | 2/1991 | Baymak .................... B09B 1/00 244/122 R |
| 5,299,852 A | 4/1994 | Beasley |
| 5,328,231 A | 7/1994 | Raymond |

(Continued)

OTHER PUBLICATIONS

Notice of Allowance and Examiner-Initiated Interview Summary for U.S. Appl. No. 15/397,859, dated Nov. 20, 2017, 9 pages.

*Primary Examiner* — Stephen P Avila
(74) *Attorney, Agent, or Firm* — Olive & Olive, P.A.

(57) ABSTRACT

A jump seat assembly is provided having a seating panel which is cushioned on one side and provides a hard surface on the other side. The panel is configured so that it is supported by a seating surface support and the panel can be reversed to provide a cushioned seating surface and in the alternative, a hard surface to allow a person to stand on the panel. A backrest is provided for when the cushioned surface is facing upward to allow the jump seat to function as a seat. The backrest can be pivoted away.

7 Claims, 8 Drawing Sheets

(56) References Cited

U.S. PATENT DOCUMENTS

| | | |
|---|---|---|
| 5,497,724 A | 3/1996 | Brown et al. |
| 6,113,182 A | 9/2000 | Wise |
| 6,230,648 B1 | 5/2001 | Davidson et al. |
| 6,629,729 B2 * | 10/2003 | Wiedeman ........... B60N 2/3011 296/65.09 |
| 6,945,190 B1 | 9/2005 | Frandsen |
| 6,969,119 B1 | 11/2005 | Jennings |
| 7,275,490 B1 | 10/2007 | Sanders |
| 7,302,906 B2 | 12/2007 | Burroughs et al. |
| 7,513,211 B1 | 4/2009 | Farb et al. |
| 8,091,957 B2 | 1/2012 | Allmann |
| 9,021,975 B1 | 5/2015 | Fodor et al. |
| 9,896,165 B2 | 2/2018 | Neese et al. |
| 10,399,644 B1 * | 9/2019 | Neese ..................... B63B 29/04 |
| 2007/0151501 A1 | 7/2007 | Burroughs et al. |
| 2007/0158986 A1 | 7/2007 | Adams et al. |
| 2010/0037813 A1 | 2/2010 | Sahr et al. |
| 2011/0227382 A1 | 9/2011 | Hay |
| 2015/0076874 A1 | 3/2015 | Neese et al. |

* cited by examiner

JUMP SEAT ASSEMBLY

CROSS-REFERENCE TO RELATED APPLICATIONS

This application is a continuation of application Ser. No. 15/903,105 filed Feb. 23, 2018 and claims priority to the filing date thereof.

FIELD OF INVENTION

This invention relates to a jump seat assembly for a boat, typically the cockpit thereof, which can be converted from a seat to a standing platform to allow walking through the stern of the boat and/or to stand on the platform to facilitate fishing.

BACKGROUND

Boats come in many different configurations and include a number of different arrangements for seating. More specifically, boats having an open cockpit often include as part of the arrangement within the cockpit a number of seats and/or platforms to allow sitting, and/or standing on such platforms for fishing purposes.

One particular type of configuration involves a raised support, for example, located towards the stern within the cockpit of a boat on which a person can stand to allow easier fishing. Such platforms are often convertible by the addition of cushions which can be snapped on to the platform through the use of, for example, snap fasteners. A problem with such a seat is that it presents a complicated arrangement for which a backrest for the seat can also be added. Typically such backrest arrangements involve a removable backrest which is held in position through engagement with posts extending downward from the backrest through openings on the platform.

While allowing conversion from a standing platform to a seat, such arrangements are complicated and involve multiple parts which must be removed and stowed, for example, when it is desired to use the platform as a fishing platform, the cushion must be unsnapped and the backrest removed and stored in some other storage area of the boat.

In accordance with the invention, the disadvantages of the prior art are avoided by providing a jump seat assembly which can be converted between a standing platform configuration and a seat with great ease, and without requiring removal and storage of components making up the arrangement of the seat and platform.

SUMMARY

In one aspect, the invention involves a jump seat assembly for a boat. The jump seat assembly includes a seating surface support elevated from the floor of a boat cockpit. A panel having a cushioned surface for seating on one side, a hard surface for standing on the other side is provided. The panel is constructed for being secured on the seating surface support with the cushioned surface facing up, or with the hard surface facing up. A backrest, typically a cushioned backrest, is mounted on the seating surface support through a mechanism allowing the backrest to be pivoted away from the position supporting the users back to a position allowing a user to walk through, for example, to a swim platform extending from the stern, or to stand on the hard surface, for example, while fishing.

The mechanism typically comprises a spring loaded tubular assembly with an inner tube passing through an outer tube which is secured to the seating surface support. The inner tube includes a hexagonal shaped member which in a locked condition engages with a complementary hexagonal shaped opening in the bottom of the outer tube. While in one embodiment, a hexagonal shaped member, and corresponding opening is used, as will be apparent to those of ordinary skill, other shape members and openings can be used so long as the backrest can be locked into at least two positions, one fully deployed as a backrest and another pivoted fully away to allow passing through. Similarly, the shape of the member and corresponding opening can be such as to allow the backrest to be locked in various positions from fully deployed as a backrest to being fully pivoted away to allow passage, to intermediate locations between the two extremes. A spring mechanism provides a downward force to ensure that the inner tube hexagonal shaped member is received and held within the hexagonal shaped opening without allowing the inner tube to turn or rotate. When it is desired to move the backrest into a position allowing a user to walk through, for example, to a swim platform, one simply pulls the backrest up compressing the spring and allowing the hexagonal shaped member to be released from the complementary hexagonal shaped opening. The user can then pivot the backrest and release it so that it again locks into the new position to which it was moved.

Optionally, the hard surface of the panel further comprises a non-slip material. Preferably the seat assembly is located at the stern of the boat.

In another aspect, the invention relates to an improvement in a boat including the afore discussed jump seat assembly.

BRIEF DESCRIPTION OF THE DRAWINGS

Having thus briefly described the invention, the same will become better understood from the following detailed discussion made with reference to the drawings wherein.

DETAILED DESCRIPTION OF THE PREFERRED EMBODIMENTS

Figure 1:
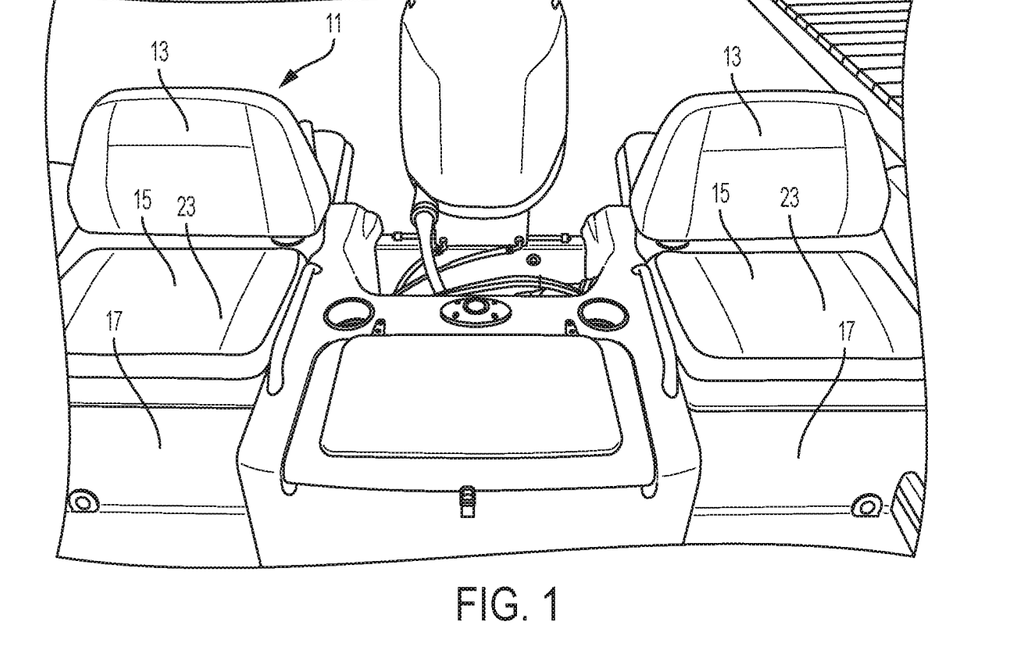
FIG. 1 is a perspective view of the jump seat assembly of the invention shown as a pair of seats located at the stern of a boat having with an open cockpit.

FIG. 1 is a perspective view of the jump seat assembly 11 shown as a pair of jump seats at the stern of a boat in accordance with the invention. The jump seat assembly 11 includes a backrest 13 and a panel 15 which includes a cushioned surface 23 as well as a hard surface 21 not shown in FIG. 1. A seating surface support 17 is provided which elevates from the cockpit floor of the boat and serves to support the panel 15. The seating surface support 17 may be hollow thereby providing a storage area.

Figure 2:
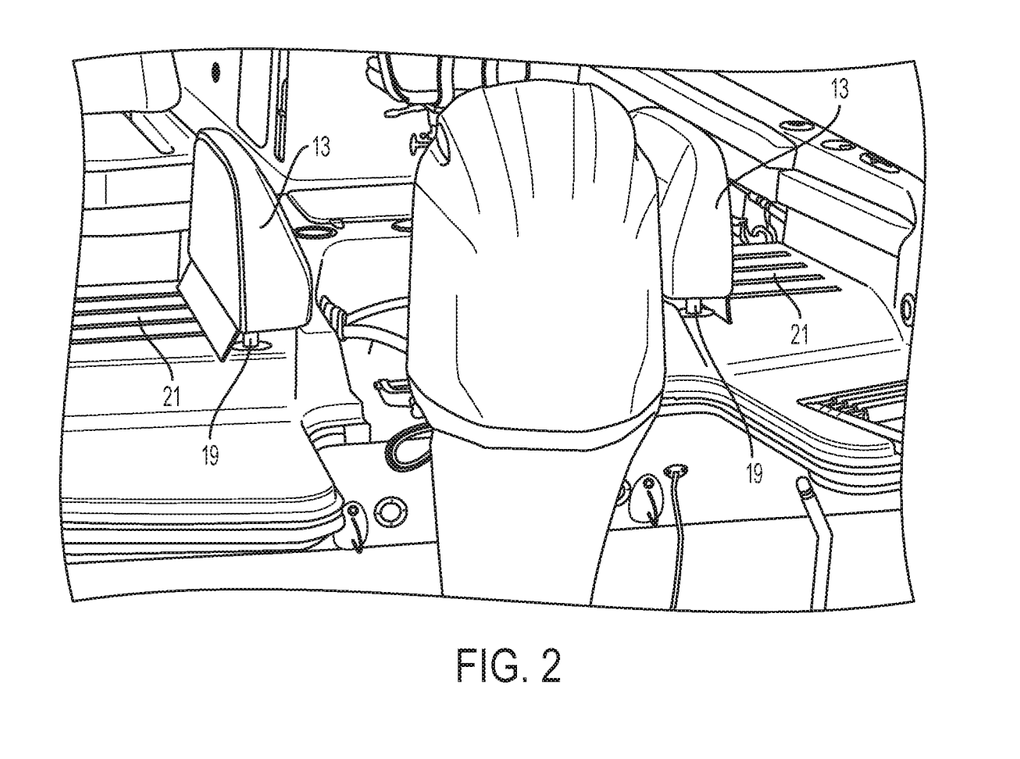
FIG. 2 is a perspective view from the rear of the boat showing the jump seat converted into a standing platform with the backrest moved out of position to allow standing and passing through from the cockpit towards; for example, a swim platform having a ladder.

FIG. 2 is a perspective view from the rear of the boat showing the jump seat assembly 11 in accordance with the invention, with the panel 15 reversed so as to present a hard surface 21 standing platform. The backrest 13 is shown pivoted away from a backrest position through use of mechanism 19 which will be described in greater details hereafter.

Figure 3:
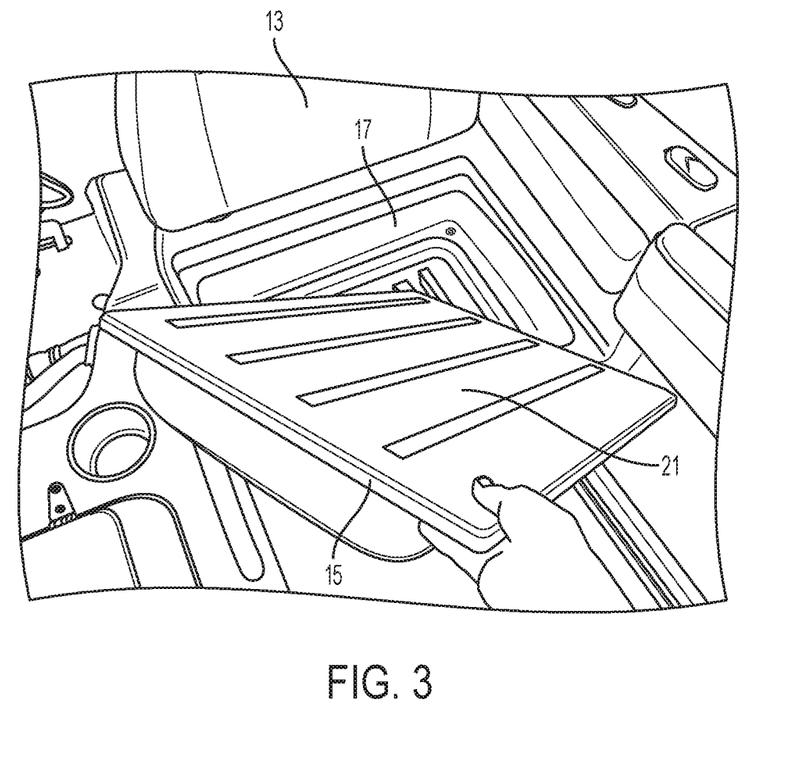
FIG. 3 is a perspective view showing the panel of the jump seat being turned so as to have the hard surface facing upward.

FIG. 3 illustrates how the panel 15 can be lifted from the seating surface support 17 and reversed so as to present the cushioned portion facing downward and the hard surface 21 facing upwards.

Figure 4:
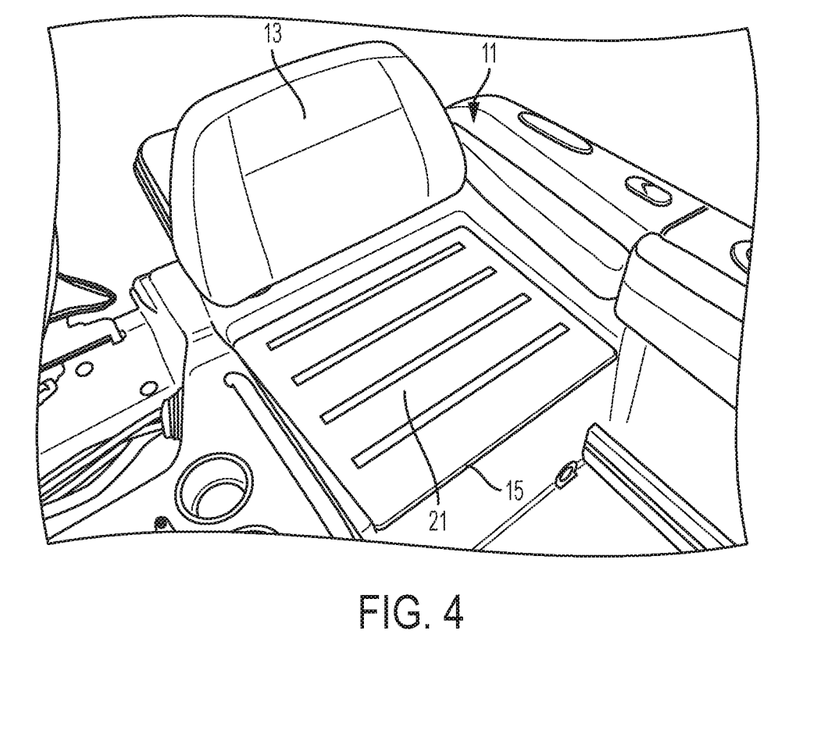
FIG. 4 shows the hard surface side of the panel facing upward in a fully assembled condition but with the backrest shown in a position for use as a backrest.

FIG. 4 illustrates the jump seat assembly 11 with the hard surface 21 of the panel 15 facing upward, but with the backrest 13 in fully deployed position for a seating configuration.

Figure 5:
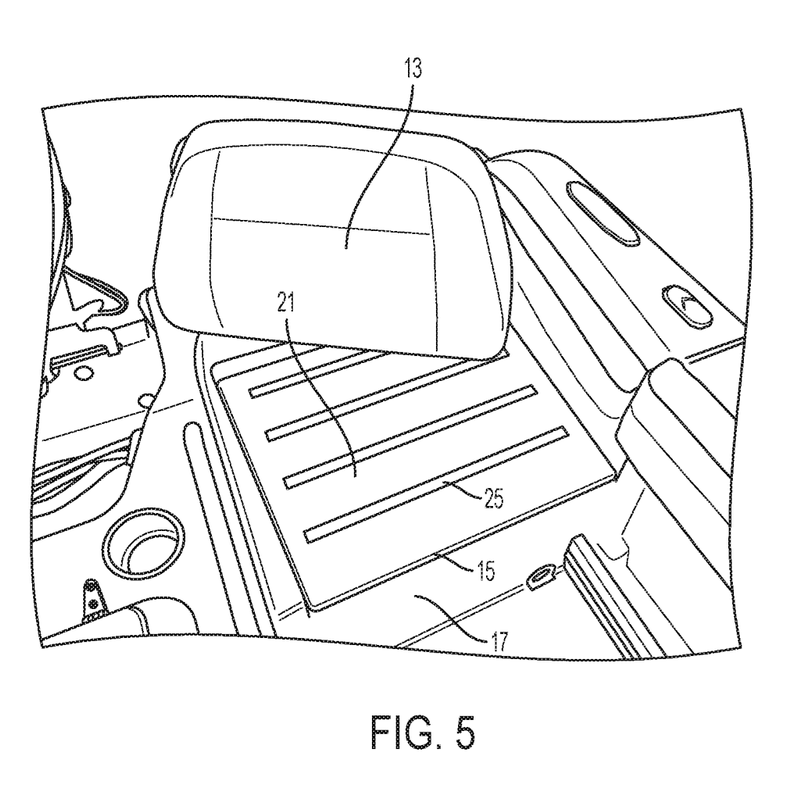
FIG. 5 is a perspective view showing how the backrest can be pivoted to be moved out of the way.
Figure 6:
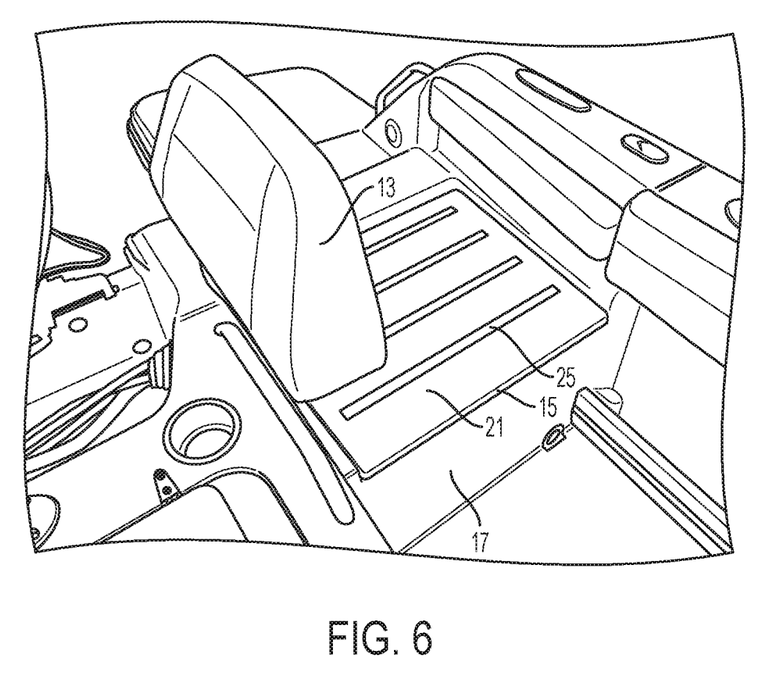
FIG. 6 is a perspective view showing the backrest moved completely out of the way for the jump seat of the invention.
Figure 7:
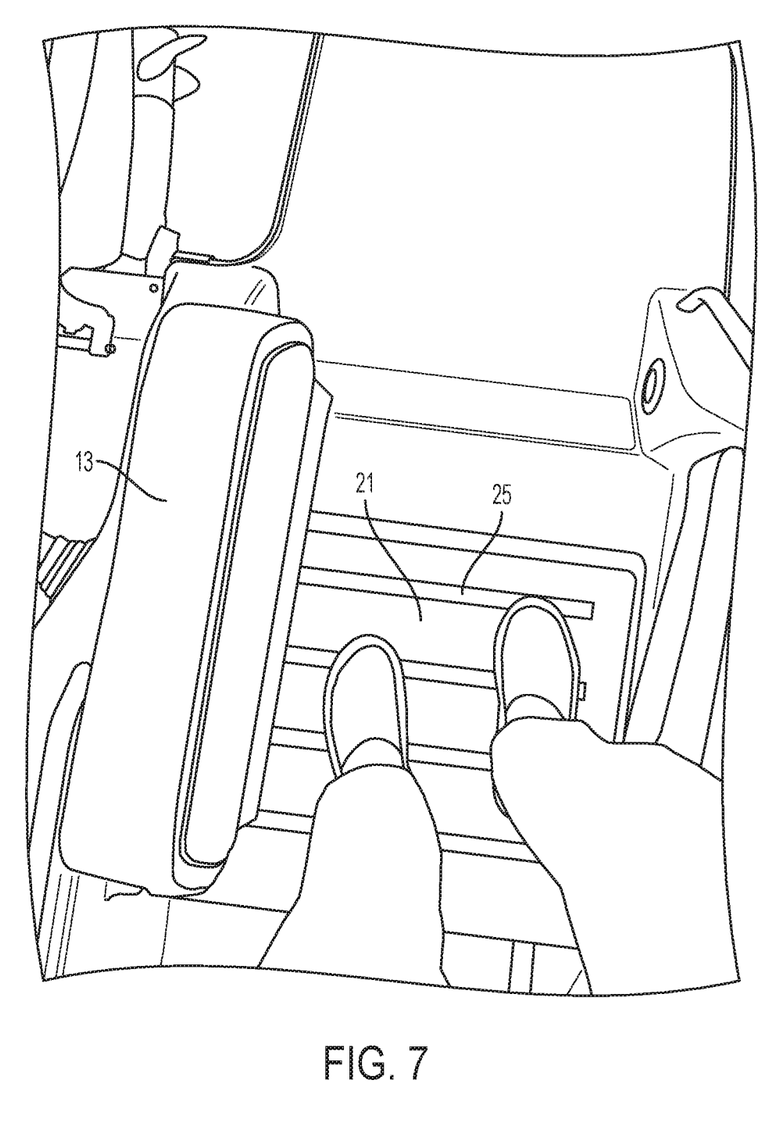
FIG. 7 is a perspective view showing a user standing on the hard surface of the panel which can also include non-slip strips.

FIG. 5 illustrates how the backrest 13 can be pivoted away, so that as shown in FIG. 6, a standing hard surface 21 is presented with non-slip strips 25 allowing a user to stand on the hard surface 21 as shown in FIG. 7 and allowing the user to be able to walk back to a swim platform of the boat while the backrest 13 is moved aside.

FIG. 6 shows the jump seat assembly 11 with the backrest 13 moved away, and the hard surface 21 with non-slip strips 25 facing up.

FIG. 7 shows a user standing on the hard surface 21.

Figure 8:
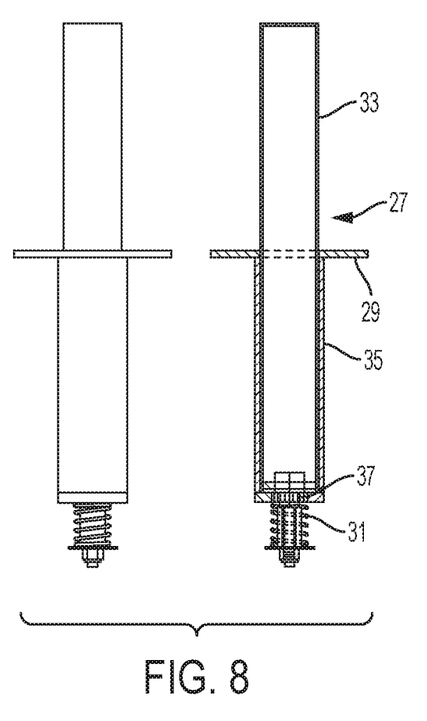
FIG. 8 is a partial cross-section view and side view of the mechanism for allowing pivoting of the backrest.
Figure 9:
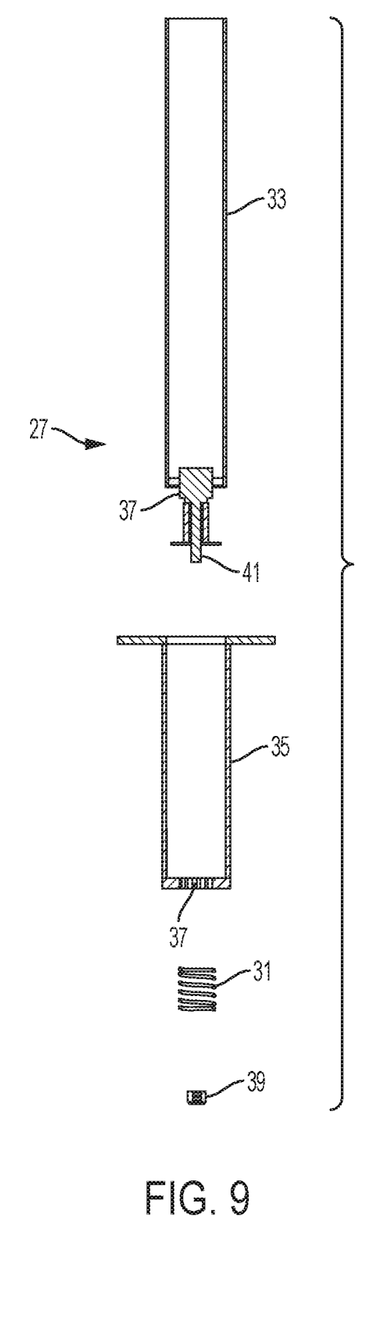
FIG. 9 is a disassembled view of the mechanism and FIG. 8.

FIGS. 8 and 9 illustrate the side view and partial side cross-sectional view of the mechanism 19 for allowing movement of the backrest 13 of the jump seat assembly 11 of the invention. The mechanism 19 includes an assembly of components 27 which includes an inner tube 33 which passes into an outer tube 35 located below a plate 29 which supports the mechanism 19 on the seating surface support 17. Inner tube 33 is rotatable within outer tube 35 and projects into the backrest 13. Outer tube 35 is generally closed at the bottom but includes an opening which allows a hexagonal shaped member 37 to be received within the opening in a fixed position with spring arrangement 31 urging the inner tube 33 downwards so that the hexagonal shaped member 37 is received within hexagonal shaped opening at the bottom of outer tube 35 to be locked in position. This is shown in greater detail also in FIG. 9. When it is desired to rotate the seat back or the backrest 13, one simply needs to pull the backrest 13 upward against the resistance force of the spring arrangement 31 to cause the hexagonal shaped member 37 to be withdrawn from the corresponding hexagonal opening at the bottom of outer tube 35, to allow the backrest 13 to be rotated. Once the backrest 13 is rotated, the backrest 13 is allowed to move downward as urged by the spring arrangement 31 to be locked into a desired position.

As previously noted, while a hexagonal shaped member 37 is described, it can take other forms as will be readily apparent to those of ordinary skill.

Figure 10:
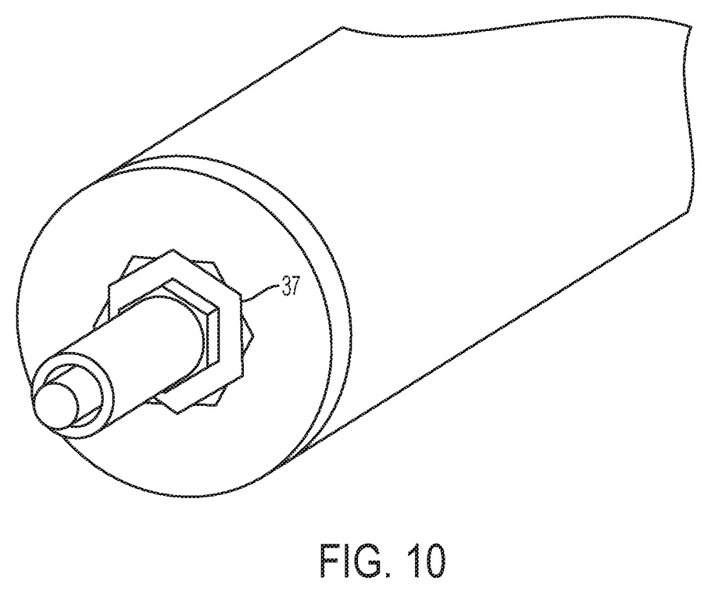
FIG. 10 is a perspective end view showing a locking hexagonal shaped member of the mechanism for moving the backrest.

FIG. 10 shows the hexagonal shaped member 37 in association with a correspondingly shaped opening at the bottom of outer tube 35.

Having thus generally described the invention, the same will become better understood from the appended claims in which it is set forth in a non-limiting manner.

What is claimed is:

1. A jump seat assembly for a boat, comprising:
    (a) a seating surface support elevated from a floor of a boat cockpit; and
    (b) a backrest supported on said seating surface support,
        i. said backrest having a pivot for moving the backrest from a first position wherein the backrest occupies a location for supporting a user's back, to a second position wherein a user can walk through at least a part of the location occupied by the backrest in the first position, and
        ii. said backrest having a lock at the pivot for alternatively locking the backrest in at least the first position and the second position.

2. The jump seat assembly of claim 1, wherein the seat assembly is located at the stern of the boat.

3. The jump seat assembly of claim 2, comprising two jump seat assemblies located at the stern of a boat adjacent each other.

4. The jump seat assembly of claim 1, wherein the backrest includes a cushion.

5. The jump seat assembly of claim 1, comprising two jump seat assemblies located at the stern of a boat adjacent each other.

6. The jump seat assembly of claim 1, wherein the backrest includes a cushion.

7. The jump seat assembly of claim 1, further comprising a panel having a cushioned surface for seating on one side and a hard surface for standing on the other side, said panel being constructed for being alternatively secured on the seating surface support with the cushioned surface facing up or the hard surface facing up.

* * * * *